US008465059B1

(12) United States Patent
Price et al.

(10) Patent No.: US 8,465,059 B1
(45) Date of Patent: Jun. 18, 2013

(54) RV SEWAGE DISPOSAL HOSE WITH SWIVELING CONNECTOR

(75) Inventors: Clay D. Price, Stokesdale, NC (US); Jeffrey R. Russell, Winston-Salem, NC (US); Robert Mancari, High Point, NC (US); Bruce A. Angel, Stokesdale, NC (US); Dallas V. Eisenhauer, Summerfield, NC (US); William T. Brockington, Kernersville, NC (US)

(73) Assignee: CAMCO Manufacturing, Inc., Greensboro, NC (US)

( * ) Notice: Subject to any disclaimer, the term of this patent is extended or adjusted under 35 U.S.C. 154(b) by 372 days.

(21) Appl. No.: 12/766,425

(22) Filed: Apr. 23, 2010

Related U.S. Application Data

(60) Provisional application No. 61/172,546, filed on Apr. 24, 2009.

(51) Int. Cl.
*F16L 27/00* (2006.01)

(52) U.S. Cl.
USPC .......................................... 285/278; 285/921

(58) Field of Classification Search
USPC .............. 285/81, 89, 92, 121.3, 121.6, 144.1, 285/148.1, 181, 275, 276, 278, 280, 921, 285/86
See application file for complete search history.

(56) References Cited

U.S. PATENT DOCUMENTS

| 149,441 | A | * | 4/1874 | Caswell | 285/148.15 |
| 168,970 | A | * | 10/1875 | Caswell | 285/354 |
| 171,964 | A | * | 1/1876 | Syversen | 285/181 |
| 244,446 | A | * | 7/1881 | Gillespie | 285/280 |
| 244,804 | A | * | 7/1881 | Gilmore | 285/280 |
| 1,672,879 | A | * | 6/1928 | Campbell, Jr. | 285/148.4 |
| 2,144,117 | A | * | 1/1939 | Miller | 285/275 |
| 2,960,353 | A | * | 11/1960 | Woodling | 285/89 |
| 3,189,372 | A | * | 6/1965 | Johnson | 285/91 |
| 3,519,290 | A | * | 7/1970 | Dunlap et al. | 285/81 |
| 3,588,149 | A | * | 6/1971 | Demler, Sr. et al. | 85/110 |
| 3,640,552 | A | * | 2/1972 | Demler et al. | 285/110 |
| 3,958,818 | A | * | 5/1976 | Mason | 285/92 |
| 4,214,779 | A | * | 7/1980 | Losell | 285/93 |
| 4,410,281 | A | * | 10/1983 | Crookes | 366/341 |
| 4,558,889 | A | * | 12/1985 | Gans | 285/7 |
| 4,796,669 | A | * | 1/1989 | St. Onge | 138/97 |
| 4,878,900 | A | * | 11/1989 | Sundt | 604/119 |
| 4,946,204 | A | * | 8/1990 | Boticki | 285/281 |

(Continued)

OTHER PUBLICATIONS

Camco RV Accessories Catalog 2007 (5 pages).

(Continued)

*Primary Examiner* — Aaron Dunwoody
(74) *Attorney, Agent, or Firm* — Womble Carlyle Sandridge & Rice LLP

(57) ABSTRACT

A swivel coupling is provided for a waste disposal system having a first waste disposal component and a second waste disposal component. The swivel coupling comprises a first coupling portion having a first end and a second end, the second end being configured for connection to the first waste disposal component, and a second coupling portion having a third end and a fourth end, the fourth end being configured for connection to the second waste disposal component. The first end is rotatably connected to the third end such that when the second end is connected to the first waste disposal component and the fourth end is connected to the second waste disposal component, the first and second coupling portions are rotatable relative to one other.

5 Claims, 11 Drawing Sheets

U.S. PATENT DOCUMENTS

| | | | | |
|---|---|---|---|---|
| 4,970,863 | A * | 11/1990 | Cunningham | 60/585 |
| 5,040,729 | A * | 8/1991 | Carrozza | 239/201 |
| 5,348,349 | A * | 9/1994 | Sloane | 285/92 |
| 5,360,242 | A * | 11/1994 | Argent | 285/330 |
| 5,476,291 | A * | 12/1995 | Reneau | 285/258 |
| 5,558,376 | A * | 9/1996 | Woehl | 285/91 |
| 5,738,388 | A * | 4/1998 | Sundelin | 285/382 |
| 5,921,580 | A * | 7/1999 | Dyer | 283/32 |
| 5,921,591 | A * | 7/1999 | Argent | 285/330 |
| 6,447,017 | B1 * | 9/2002 | Gilbreath et al. | 285/89 |
| 6,991,262 | B1 * | 1/2006 | Ragner | 285/7 |
| 7,156,574 | B1 * | 1/2007 | Garst | 4/323 |
| 7,284,774 | B2 * | 10/2007 | Bauer et al. | 285/319 |
| 7,654,582 | B2 * | 2/2010 | Rissik | 285/179 |
| 7,789,432 | B2 * | 9/2010 | Dohm et al. | 285/282 |
| 7,798,177 | B1 * | 9/2010 | Blair et al. | 138/155 |
| 2010/0008712 | A1 * | 1/2010 | Sitz et al. | 403/65 |
| 2010/0018590 | A1 * | 1/2010 | Damaske et al. | 137/351 |
| 2012/0049510 | A1 * | 3/2012 | Cafri | 285/121.3 |

OTHER PUBLICATIONS

Bill Plemmons RV World, RV Accessories Catalog 2010 (5 pages).

* cited by examiner

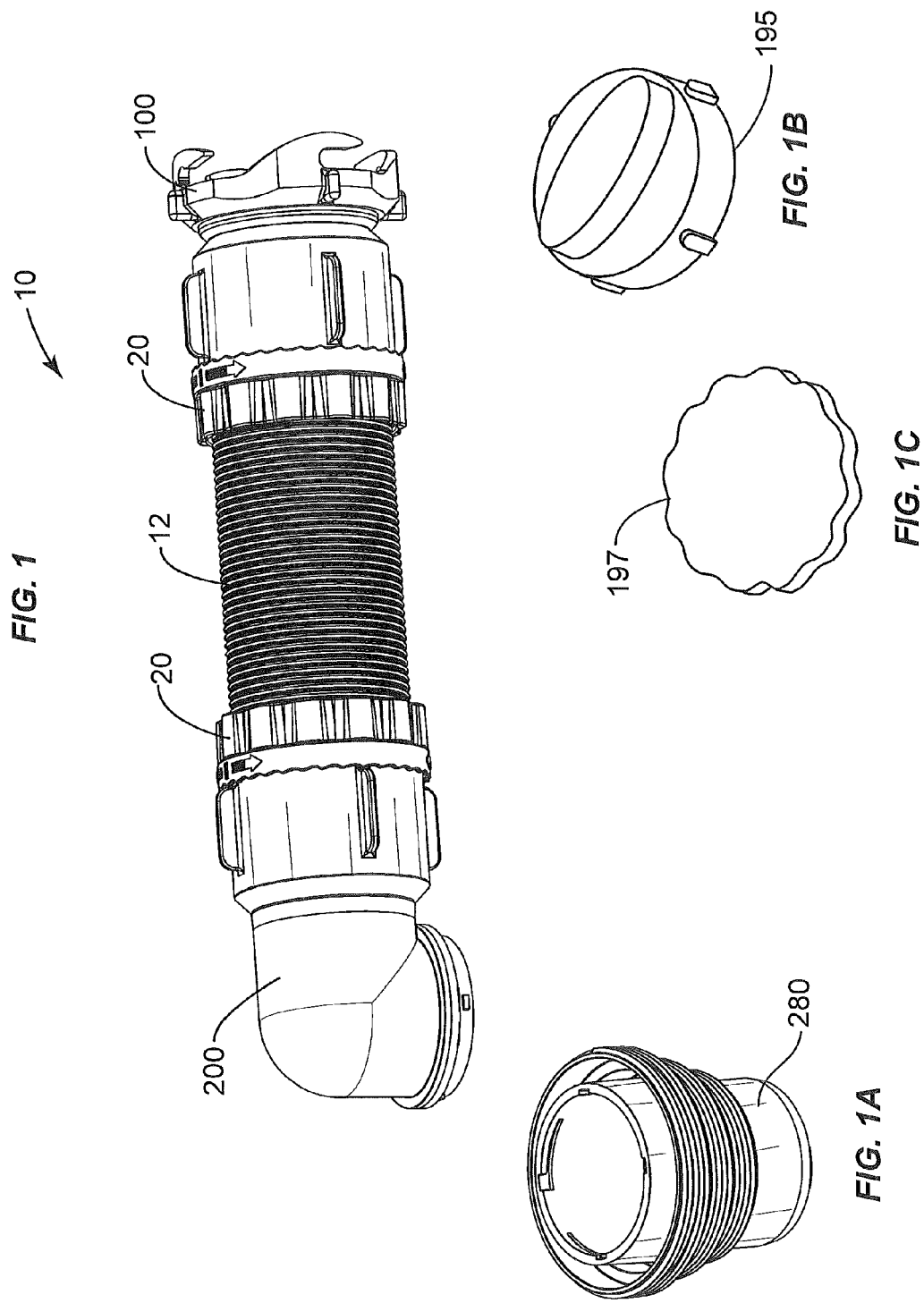

RV SEWAGE DISPOSAL HOSE WITH SWIVELING CONNECTOR

FIELD OF THE INVENTION

The present invention relates to waste disposal systems for recreational vehicles, and more particularly relates to an improved waste disposal hose system including one or more swiveling connectors or swiveling fittings for connecting an end of the hose to a recreational vehicle sewage outlet valve, or other sewage disposal component.

BACKGROUND

Many recreational vehicles include onboard storage tanks for accumulating and temporarily storing sewage and waste known as black water. Once the storage tanks are full, the sewage and waste accumulated in the storage tanks must be transferred to a waste disposal facility, such as sewage dump station. For this purpose, a recreational vehicle with on onboard black water storage tank is equipped with an outlet valve. One end of a flexible and extendable waste disposal hose is connected to the outlet valve, and an opposite end of the hose is connected to a waste disposal facility. When the outlet valve is opened, gravity causes the accumulated black water in the storage tank to flow through the outlet valve, through the hose, and into the waste disposal facility.

In order to connect the waste disposal hose to the outlet valve of a recreational vehicle, the inlet end of a typical waste disposal hose often includes a so-called "bayonet" coupling. The bayonet coupling engages a cylindrical pipe on the outlet valve, which includes a plurality of spaced knobs or buttons which outwardly extend from the outer diameter of the pipe. The bayonet coupling typically includes a plurality of circumferentially extending and tapered blades which define a plurality of circumferentially extending slots. When the buttons on the pipe are received in the slots and the bayonet coupling is rotated, the tapered blades cooperate with the buttons and cause the bayonet coupling to be pressed against the end of the pipe. A resilient gasket is compressed between the end of the outlet valve and the bayonet coupling, and substantially prevents waste and odorous gasses from escaping. The exit end of a typical black water disposal hose may include an elbow or other fitting for insertion into or connection to an inlet of a waste disposal facility.

Though known waste disposal hoses and couplings are generally satisfactory for transferring waste from a recreational vehicle black water storage tank to a dump station, they can be improved. Known waste disposal hoses typically include a length of flexible corrugated pipe or tubing that can be bent, extended, and contracted to adapt to various relative positions of an outlet valve and a dump station inlet. The fittings and couplings provided on such hoses typically are non-movably attached to the ends of the hose. Because the fittings and couplings cannot rotate or swivel relative to the hose or other waste disposal component to which they are connected, manipulation of the couplings and fittings is hindered when the couplings and fittings are being connected to an outlet valve or another waste system component. In addition, manipulation of the couplings and fittings can cause the non-movably attached hose to take on a shape which may hinder the flow of waste through the hose. More specifically, it is known that when a corrugated hose is extended, the spirally-formed corrugations tend to cause the hose to rotate and distort.

Accordingly, there is a need for waste disposal connectors and fittings that permit relative swiveling rotation between the waste disposal components which they connect. In addition, there is a need for a system and method for quickly and easily securing such swiveling connectors and swiveling fittings to a waste disposal hose.

SUMMARY

In one embodiment, a swivel coupling is provided for a waste disposal system having a first waste disposal component and a second waste disposal component. The swivel coupling comprises a first coupling portion having a first end and a second end, the second end being configured for connection to the first waste disposal component. A second coupling portion has a third end and a fourth end, the fourth end being configured for connection to the second waste disposal component. The first end is rotatably connected to the third end such that when the second end is connected to the first waste disposal component and the fourth end is connected to the second waste disposal component, the first and second coupling portions are rotatable relative to one other. At least one of the first connector portion and the second connector portion may be constructed of a substantially translucent or substantially transparent material.

In another embodiment, a hose connector is a flexible waste disposal hose of a type having a series of spiral ridges therearound. The connector comprises a swivel coupling having a first bore and including a first plurality of internal threads configured for threaded engagement with the spiral ridges on one end of the flexible waste disposal hose. A locking ring has a first end and a second bore, and a second plurality of internal threads configured for threaded engagement with the spiral ridges on the one end of the flexible waste disposal hose. When the swivel coupling and the locking ring are threadably engaged on the spiral ridges on the one end of the flexible waste disposal hose, and the locking ring is tightened against the coupling such that at least a portion of the first end contacts at least a portion of the coupling, the locking ring resists relative rotation between the swivel coupling and the one end of the flexible waste disposal hose.

A further embodiment of the invention includes a waste disposal assembly comprising a substantially cylindrical hose having a plurality of spirally arranged peaks disposed about an outer circumference, a plurality spirally arranged valleys intermittently disposed between the peaks, and a first end. A coupling is secured to the first end of the hose and includes a collar having a proximal end, a distal end, a plurality of spirally arranged first internal threads, and a plurality of spaced outwardly extending tabs, and a connector rotatably disposed on the distal end of the collar. A locking ring has a plurality of spirally arranged second internal threads and a first edge having a plurality of spaced teeth. The collar is configured to be selectively received on the first end of the substantially cylindrical hose such that the first internal threads are threadably engaged with the spirally arranged peaks and valleys. The locking ring is configured to be selectively received on the first end of the hose such that the second internal threads are threadably engaged with the peaks and valleys and the first edge is adjacent to the proximal end of the collar. The spaced teeth of the locking ring are configured to engage the spaced outwardly extending tabs of the collar, inhibiting relative rotation between the collar and the locking ring.

These and other aspects and features of the invention will be understood from a reading of the following description together with the drawings.

BRIEF DESCRIPTION OF THE DRAWINGS

FIG. 1 is an elevation view of one embodiment of a waste disposal hose system according to the invention.

FIG. 1A is a perspective view of a universal adaptor for use with the embodiment of FIG. 1.

FIG. 1B is a perspective view of an inlet end storage cap for use with the embodiment of FIG. 1.

FIG. 1C is a perspective view of an outlet end storage cap for use with the embodiment of FIG. 1.

DETAILED DESCRIPTION

Figure 3:
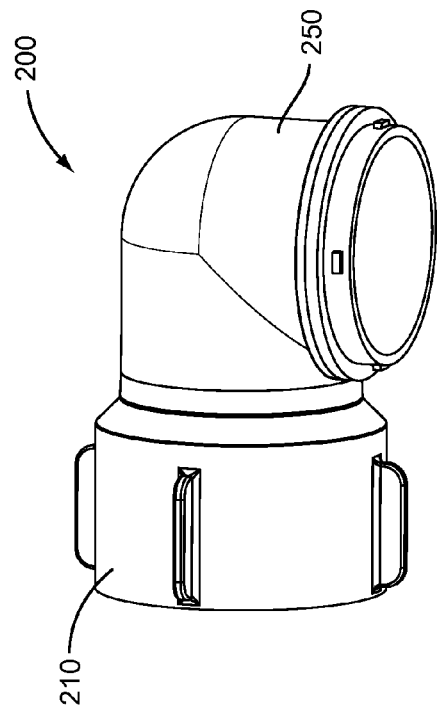
FIG. 3 is a perspective view of a swivel elbow coupling according to the invention.

One embodiment of a waste disposal hose assembly 10 according to the present invention is shown in FIG. 1. The hose assembly 10 includes a length of elongated hose or tubing 12. The tubing 12 may be corrugated plastic tubing of a type known to persons of ordinary skill in the art, for example. In one embodiment, the tubing 12 is Rhino Flex™ tubing by CAMCO Manufacturing, Inc., in Colfax, N.C. In one embodiment, the tubing 12 is constructed of polyolefin and includes a spiral metal reinforcing wire. The tubing 12 may have an accordion-like construction, which permits the tubing 12 to extend and contract in length, to bend, and to flex. In FIG. 1, a swivel female bayonet coupling 100 is connected to an inlet end of the hose assembly 10, and is configured to mate with a conventional male bayonet discharge fitting 300 (see FIG. 4) on a recreational vehicle (not shown). The opposed exit end of the hose assembly 10 may include a swivel elbow coupling 200. The swivel elbow coupling 200 may be configured to be received by a dump station universal adapter 280 (FIG. 1A) of a type known in the art. The disposal hose assembly 10 may include an inlet end storage cap 195 (FIG. 1B) for attachment to the swivel bayonet coupling 100, and an outlet end storage cap 197 (FIG. 1C) for attachment to the swivel elbow coupling 200, for example.

Figure 2:
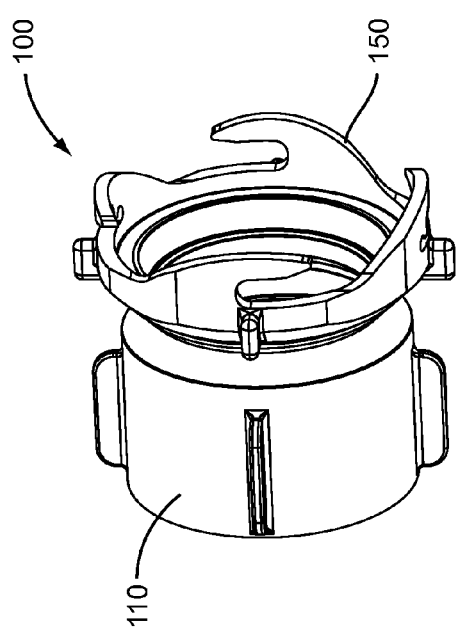
FIG. 2 is a perspective view of a swivel female bayonet coupling according to the invention.
Figure 6:
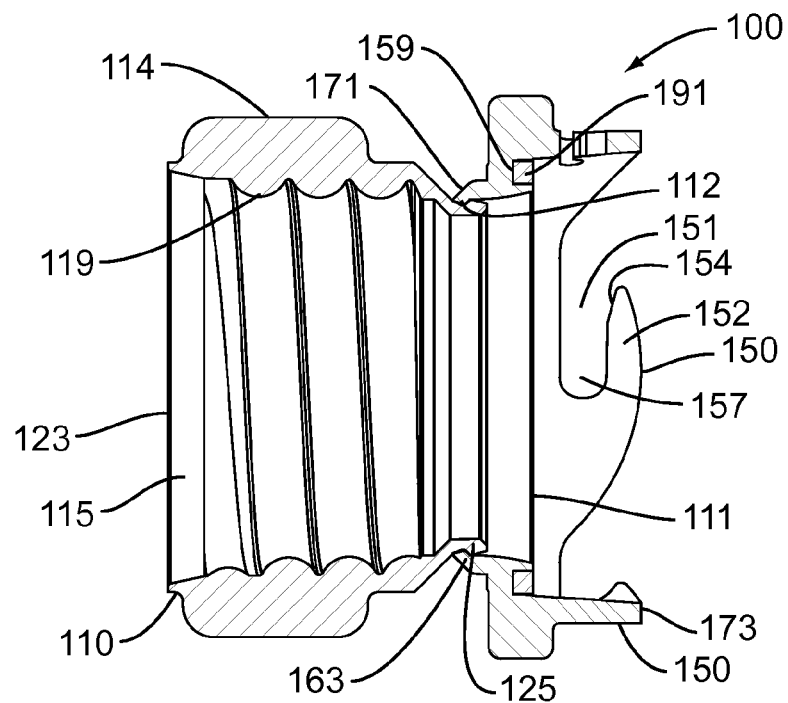
FIG. 6 is a longitudinal cross sectional view of the swivel female bayonet coupling shown in FIG. 2.

One embodiment of a swivel female bayonet coupling 100 is shown in greater detail in FIG. 2. In this embodiment, the swivel female bayonet coupling 100 includes a collar 110 and a swivel female bayonet connector 150. A longitudinal cross section of the female bayonet coupling 100 is shown in FIG. 6. In this embodiment, the collar 110 includes a first end 111 and an opposed second end 123. A central longitudinal bore 115, having a plurality of spirally arranged internal threads 119, extends through the collar 110. A plurality of tabs 114 extend radially outwardly from the collar 110. In one embodiment, the collar 110 includes four circumferentially and equally spaced tabs 114. A circumferential groove 112 extends around the collar 110 proximate the collar's first end 111. The swivel female bayonet connector 150 includes a proximate end 171 and a distal end 173. A radially inwardly extending lip 163 circumferentially extends around an inner diameter of the swivel female bayonet coupling 150 adjacent to its proximate end 171. As shown in FIG. 6, the lip 163 is configured to be received in the circumferential groove 112 in the collar 110. The lip 163 and groove 112 may be sized and shaped such that when the lip 163 is received in the groove 112, the swivel female bayonet connector 150 is free to rotate relative to the collar 110. Preferably, clearances between the lip 163 and the collar 110 are sufficiently small such that the leakage or seepage of waste material between the lip 163 and collar 110 are insubstantial during normal usage. The swivel female bayonet connector 150 includes a plurality of circumferentially extending slots 151 and a plurality of circumferentially extending blades 152. Each of the blades 152 includes a tapered edge 154, and each of the slots includes a rounded end 157. The slots 151 and blades 152 may be configured to permit the swivel female bayonet connector 150 to be securely engaged with a conventional male bayonet connector 300 of a type commonly found on the waste discharge valve of a recreational vehicle. The swivel female bayonet connector 150 also may include a circumferentially recessed groove 159 for receiving a resilient gasket 191.

Figure 7:
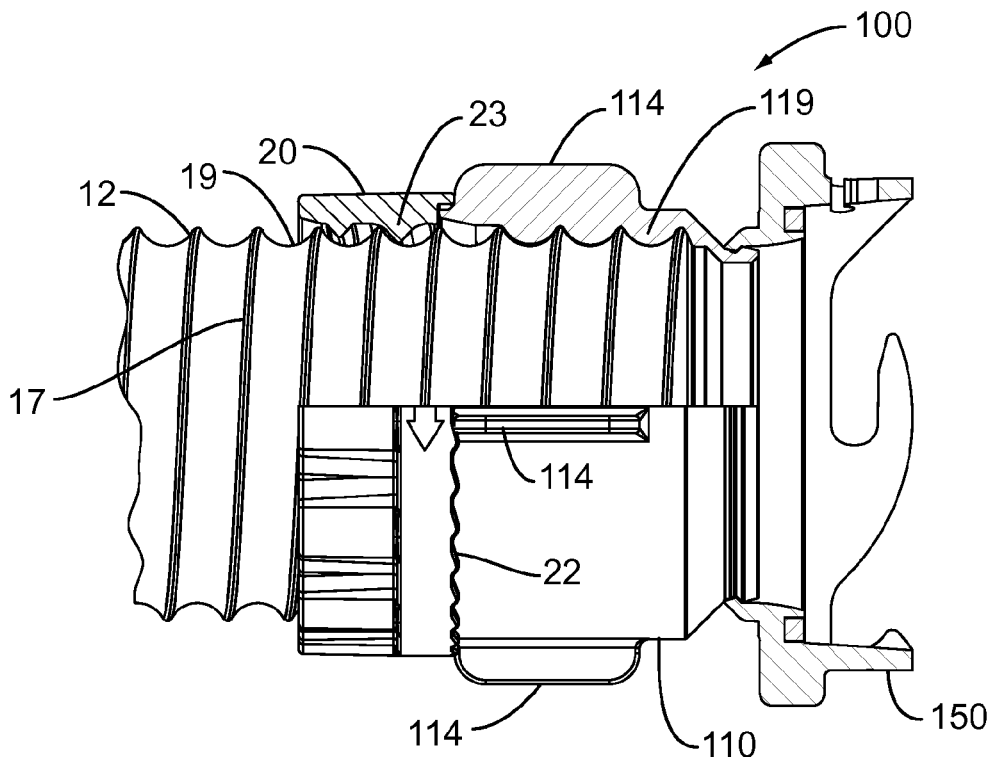
FIG. 7 is a longitudinal cross sectional view of the female bayonet coupling shown in FIGS. 2 and 6 attached to one end of a hose.

A swivel female bayonet coupling 100, attached to an end of a hose 12, is shown in greater detail in FIG. 7. The collar 110 is threadably engaged over the spiral peaks 17 on the hose 12. The spirally arranged threads 119 of the collar 110 are received in valleys 19 disposed between the spiral peaks 17. As shown in FIG. 1 and in FIG. 6, a locking ring 20 may be disposed around the hose 12 proximate to the collar 110. As shown in FIG. 7, the locking ring 20 includes spirally arranged internal threads 23, which also are received in the valleys 19 disposed between the raised spiral peaks 17 of the hose 12. The locking ring 20 can be rotated and advanced toward the collar 110 until at least a portion of the locking ring 20 contacts the collar. As the locking ring 20 is tightened against the collar 110, frictional contact is established between the locking ring 20 and collar 110, and the engaged portion of the hose 12 is longitudinally and elastically stretched. Due to the resiliency of the hose 12, the stretched hose 12 acts to pull the locking ring 20 and the collar 110 firmly together. The resulting frictional contact between the locking ring 20 and the collar 110 is sufficient to substantially prevent accidental or unwanted loosening or separation of the collar 110 from the end of the hose 12.

As shown in FIG. 7, the end of the locking ring 20 which is adjacent to the collar 110 may include a series of spaced teeth or serrations 22. When the locking ring 20 is tightened against the collar 110 and the hose 12 is stretched between the locking ring 20 and collar 110, the teeth 22 will engage the tabs 114 such that the teeth 22 substantially block relative rotation between the collar 110 and the locking ring 20.

To remove the collar 110 from the hose 12, the locking ring 20 is manually twisted until frictional contact between the locking ring 20 and collar 110 is overcome and/or until the teeth 22 disengage from the tabs 114, thus permitting the collar 110 to be rotated until its threads 119 are disengaged form the peaks 17 of the hose 12.

Figure 8A:
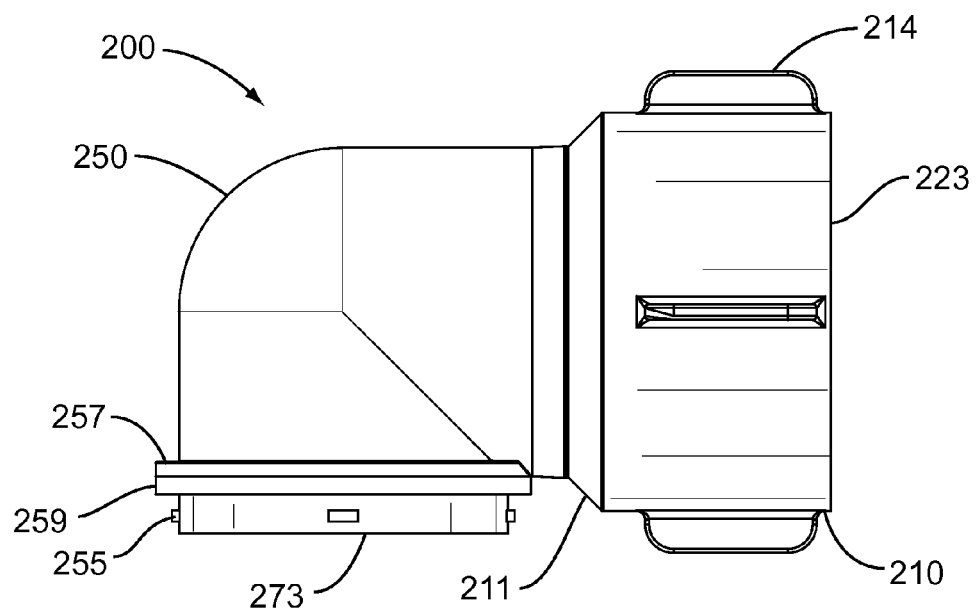
FIG. 8A is an elevation view of the swivel elbow coupling shown in FIG. 3.
Figure 8B:
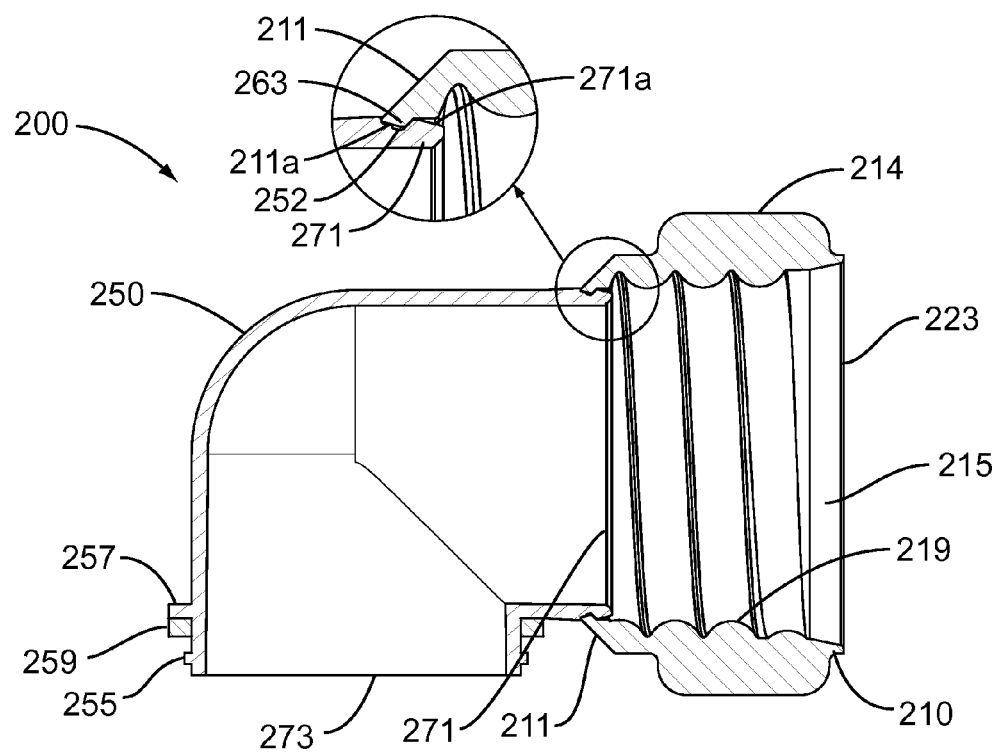
FIG. 8B is a longitudinal cross sectional view of the swivel elbow coupling shown in FIGS. 3 and 8A.

One embodiment of swivel elbow coupling 200 is shown in FIGS. 3, 8A, and 8B. In this embodiment, the swivel elbow coupling 200 includes a collar 210 and a swivel elbow 250. The swivel elbow 250 is rotatably coupled to the collar 210. A longitudinal cross section of the swivel elbow coupling 200 is shown in FIG. 8B. In this embodiment, the collar 210 includes a first end 211 and an opposed second end 223. A bore 215 having a plurality of spirally arranged internal threads 219 longitudinally extends through the collar 210. A plurality of spaced tabs 214 extend radially outwardly from the collar 210. In one embodiment, the collar 210 includes four circumferentially and equally spaced tabs 214. A radially inwardly extending lip 263 circumferentially extends around an inner diameter of the collar 210 proximate its first end 211. The elbow 250 includes a proximal end 271 and a distal end 273. A groove 252 circumferentially extends around the proximal end 271 of the elbow 250. As shown in FIG. 8B, the lip 263 of the collar 210 is configured to be received in the circumferential groove 252 in the elbow 250. The lip 263 and groove 252 may be sized and shaped such that when the lip 263 is received in the groove 252, the elbow 250 is free to rotate relative to the collar 210. Preferably, clearances between the lip 263 and the collar 210 are sufficiently small such that the leakage or seepage of waste material between the lip 263 and collar 210 are insubstantial under normal conditions.

As shown in the circled detail of FIG. 8B, the first end 211 of the collar 210 may include a first frusto-conical surface 211a, and the proximal end 271 of the elbow 250 may include a second frusto-conical surface 271a. During assembly of the collar 210 and the elbow 250, the proximal end 271 of the elbow 250 may be pressed into the first end 211 of the collar 210. During such insertion, the first frusto-conical surface 211a and the second frusto-conical surface 271a cooperate to resiliently wedge the first end 211 radially outward and to resiliently wedge the proximate end 271 radially inward, thereby permitting the lip 263 to move past the second frusto-conical surface 271a until the lip 263 is received in the groove 252. Once resiliently snapped together in this manner, the collar 210 and the elbow 250 are securely connected together. A lubricant may be applied in the groove 252 and/or on the lip 263 to minimize friction and facilitate relative rotation between the elbow 250 and the collar 210.

As shown in FIGS. 8A and 8B, the elbow 250 may include a flange 257 near its distal end 273 for supporting a gasket 259. The elbow 250 also may include a plurality of tabs 255 to assist in retaining the gasket 259 on the distal end 273 of the elbow 250 and for use in retaining a cap or cover 197 (FIG. 1) on the distal end 273 of the elbow 250. Though the elbow 250 shown in FIGS. 3, 8A and 8B is a 90-degree elbow, the elbow 250 also may be constructed as a 45-degree elbow or an elbow of substantially any angle between about 0 degrees and 180 degrees. The elbow 250 also may be constructed of a translucent or transparent material to permit a user to visually determine whether waste material is flowing or is present within the elbow 250. A locking ring 20, like that shown in FIG. 7, may be used to securely affix the elbow coupling 200 to an end of the corrugated hose 12.

Figure 9:
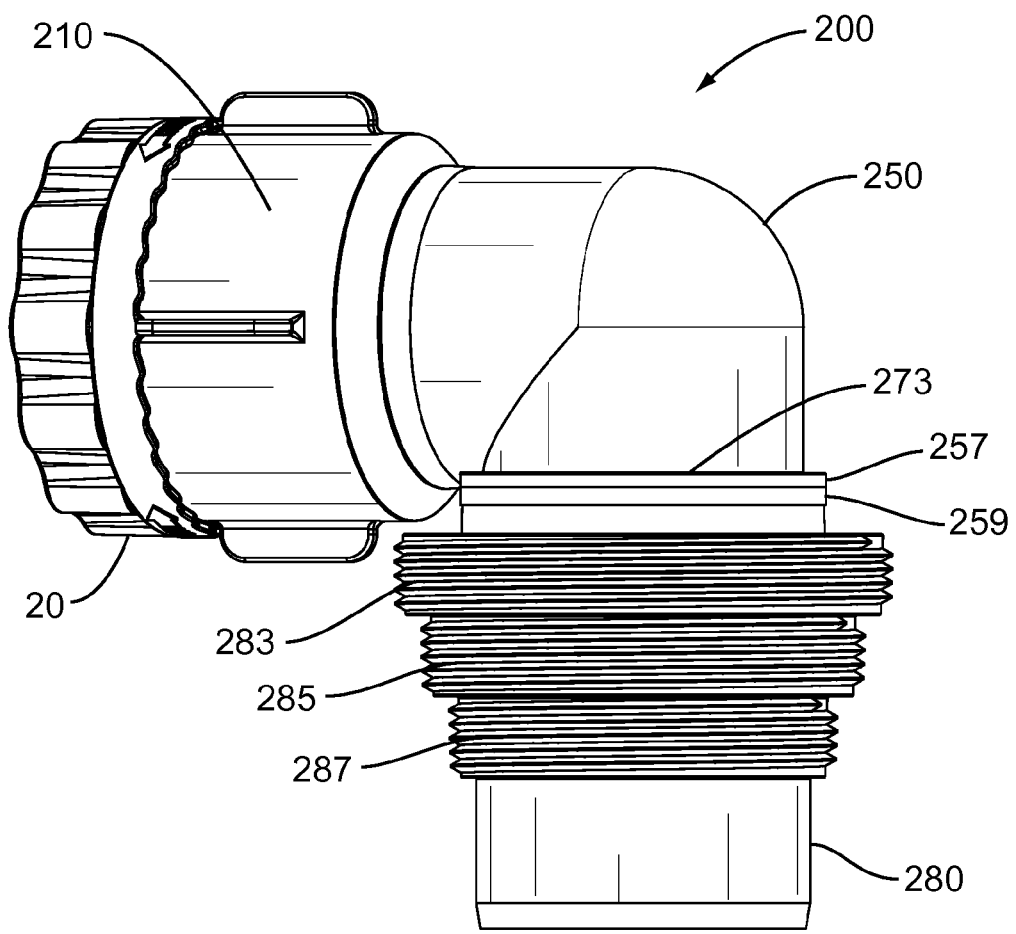
FIG. 9 is a perspective view of the swivel elbow coupling shown in FIG. 3 with its exit end inserted into a dump station adapter.

As shown in FIG. 9, the distal end 273 of the elbow 250 may be configured for insertion into an entrance end of a universal dump station adapter 280. When the elbow 250 is inserted into the adapter 280, the gasket 259 is disposed between the flange 257 and the adapter 280 to prevent leakage or seepage of waste material or odorous gasses. The adapter 280 may include pluralities of variously sized threaded portions 283, 285, 287, which enable the adapter 280 to fit tightly within waste station inlet threaded pipes of various diameters.

Figure 5:
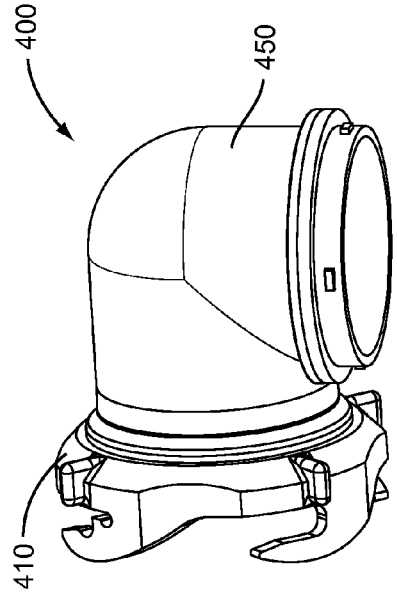
FIG. 5 is a perspective view of a swivel elbow coupling with a female bayonet connector according to the invention.
Figure 4:
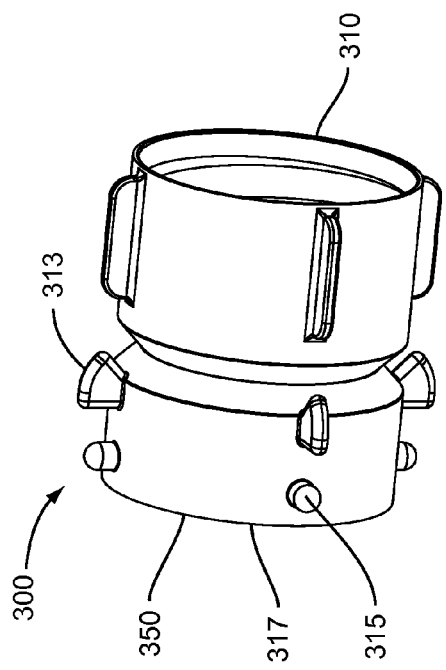
FIG. 4 is a perspective view of a swivel male bayonet coupling according to the invention.

Other embodiments of a rotatable hose coupling according to the invention are shown in FIGS. 4 and 5. In FIG. 4, a swivel male bayonet coupling 300 is shown. A male bayonet connector 350 is rotatably connected to a collar 310 in a manner that is substantially similar to the rotating connection between swivel elbow 250 and collar 210 described above. The collar 310 may be substantially similar to the collars 110, 210 described above. The male bayonet connector 350 includes a cylindrical body 317 and a plurality of circumferentially spaced and outwardly extending buttons 315. A plurality of circumferentially spaced and outwardly extending tabs 313 may be provided for manually gripping and rotating the connector 350. The swivel male bayonet coupling 300 may be secured to an end of a corrugated hose 12 with a locking ring in a manner that is substantially similar to that illustrated in FIG. 7, for example. In FIG. 5, another swivel elbow coupling 400 is shown. In this embodiment, an elbow fitting 450 is rotatably connected to a female bayonet connector 410. The female bayonet connector 410 may be substantially similar to the female bayonet connector 150 shown in FIG. 6 and described above. The female bayonet connector 410 may be removably connected to the male bayonet connector 350 shown in FIG. 4 or to a male bayonet connector on an RV discharge valve.

Figure 10A:
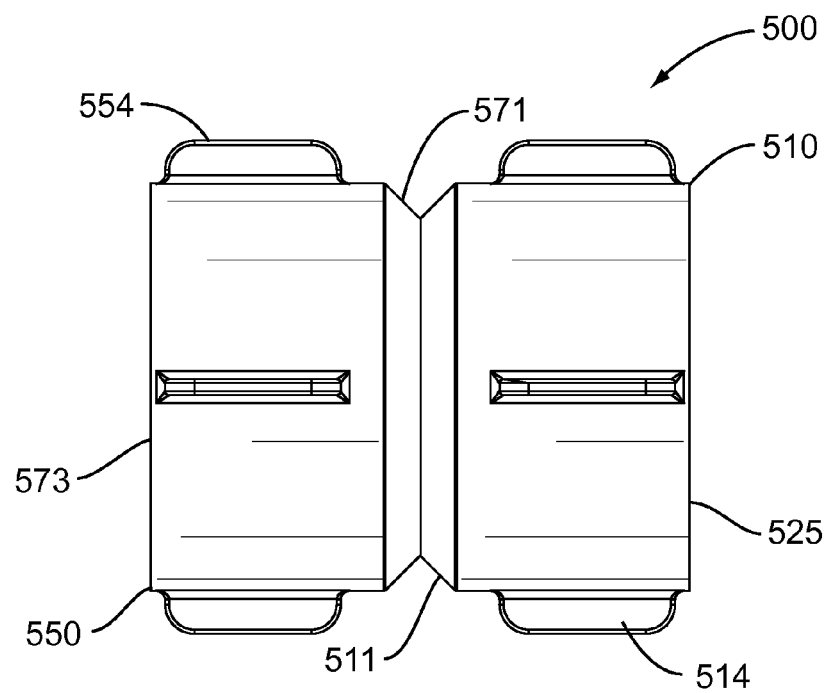
FIG. 10A is an elevation view of a swivel hose coupling according to the invention.
Figure 10B:
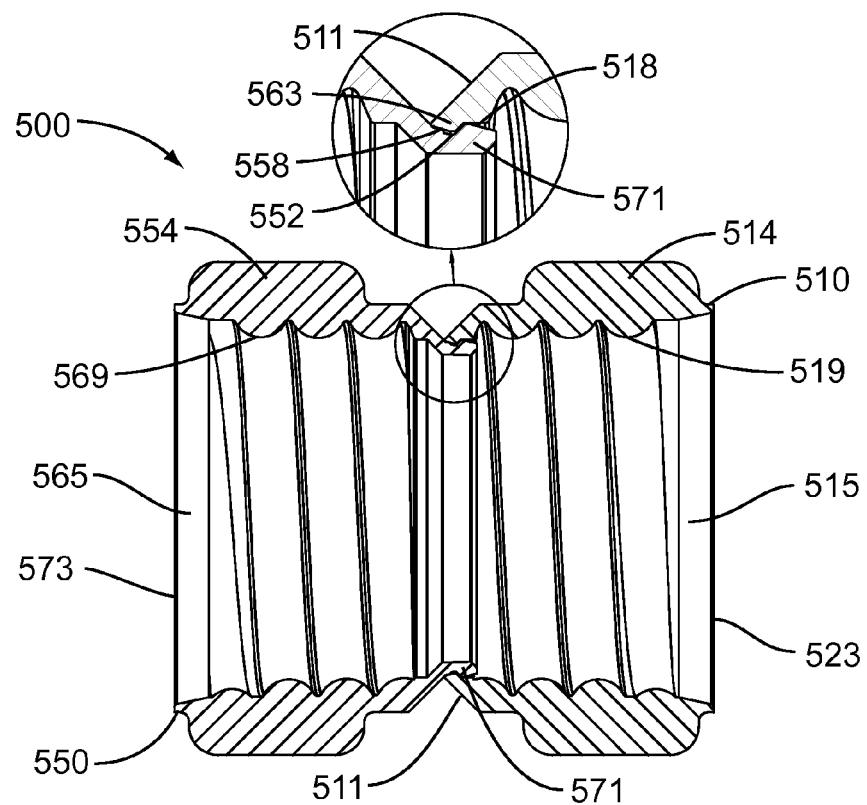
FIG. 10B is a longitudinal cross sectional view of the swivel hose coupling shown in FIG. 10A.

FIGS. 10A and 10B show one embodiment of a swivel hose coupling 500 according to the present invention. The swivel hose coupling 500 may be used to rotatably connect ends of two separate hose sections, for example. A distal end 511 of a first collar 510 is rotatably connected to a distal end 571 of second collar 550. As shown in FIG. 10B, the distal end 571 of the second collar 550 may include a circumferentially extending groove 552 configured to receive a circumferentially extending lip 563 on the distal end 511 of the first collar 510. As shown in the circled detail of FIG. 10B, the distal end 511 of the first collar 511 may include a first frusto-conical surface 558, and the distal end 571 of the second collar 550 may include a second frusto-conical surface 518. During assembly of the first and second collars 510, 550, the distal end 571 of the second collar 550 may be pressed into the distal end 511 of the first collar 510. During such insertion, the first frusto-conical surface 558 and the second frusto-conical surface 518 cooperate to resiliently wedge the distal end 511 radially outward and to resiliently wedge the distal end 571 radially inward, thereby permitting the lip 563 to move past the second frusto-conical surface 518 until the lip 563 is received in the groove 552. Once resiliently snapped together in this manner, the first collar 510 and the second collar 550 are securely connected together. A lubricant may be provided in the groove 552 and/or on the lip 563 to facilitate rotation of the lip 563 within the grove 552.

The first collar 510 may include a first threaded bore 515 having a first plurality of internal threads 519, and the second collar 550 may include a second threaded bore 565 having a second plurality of internal threads 569. The first collar 510 can be threadably received on an end of a first hose and secured with a locking ring in a manner similar to that shown in FIG. 7 and described above. Similarly, the second collar 550 may be threadably received on an end of a second hose and secured with a locking ring. Once connected, the swivel hose coupling 500 provides a secure and substantially leaktight connection between the joined hoses while permitting the connected ends of the hoses to rotate relative to one another about their respective longitudinal axes.

Figure 11:
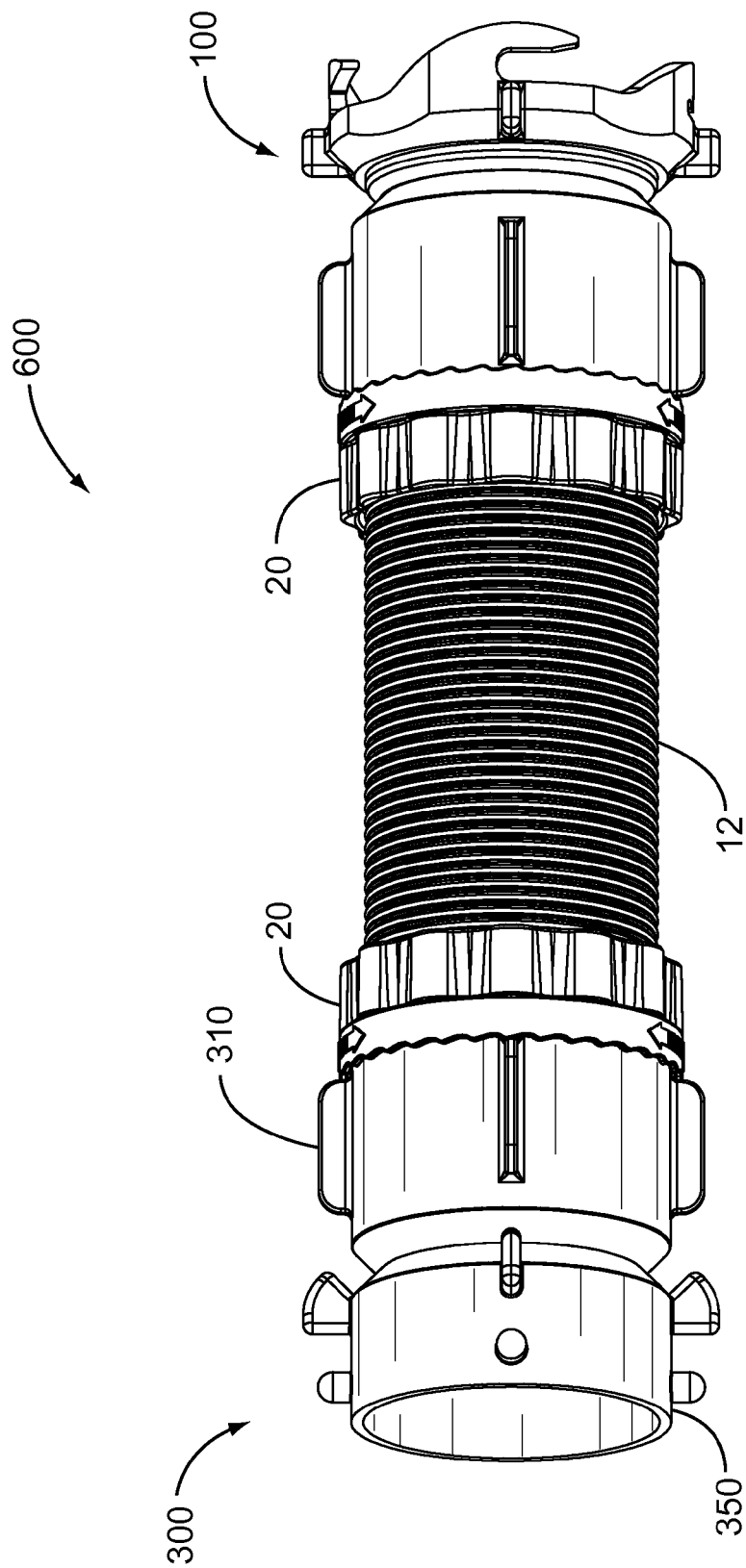
FIG. 11 is an elevation view of another embodiment of a waste disposal hose system according to the invention.

FIG. 11 is illustrative of another embodiment of a waste disposal hose assembly 600 according to the present invention. In this embodiment, a swivel female bayonet coupling 100, like that shown in FIGS. 2, 6, and 7, and described above, is removably attached to one end of a corrugated hose 12. A swivel male bayonet coupling 300, like that shown in FIG. 4, and described above, is removably attached to an opposite end of the hose 12. The couplings 100, 300 again may be secured to the hose 12 with locking rings 20, as shown in FIG. 7, and as described above, for example.

Figure 12:
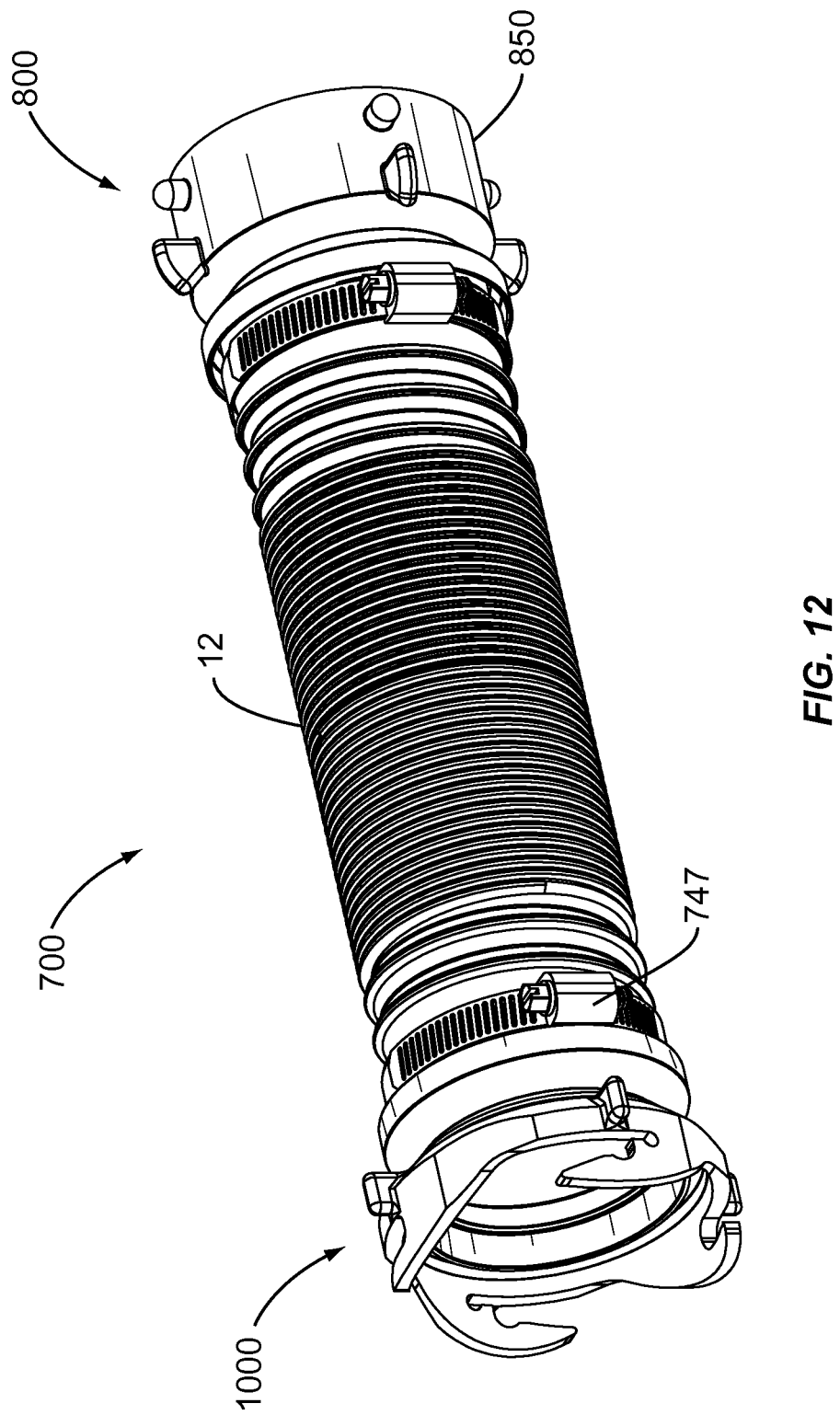
FIG. 12 is a perspective view of a further embodiment of a waste disposal hose system according to the invention.

FIG. 12 shows yet another embodiment of a waste disposal hose assembly 700 according to the present invention. In this embodiment, a male swivel bayonet coupling 800 is removably attached to one end of a hose 12, and a female swivel bayonet coupling 1000 is removably attached to the opposite end of the hose 12. The couplings 800, 1000 may be substantially similar to the other swivel couplings described above, except for their means or mode of attachment to the hose 12. As shown in FIG. 12, the couplings 800, 1000 may be secured to the opposed ends of the hose 12 with conventional hose clamps 747, or the like.

Figure 13:
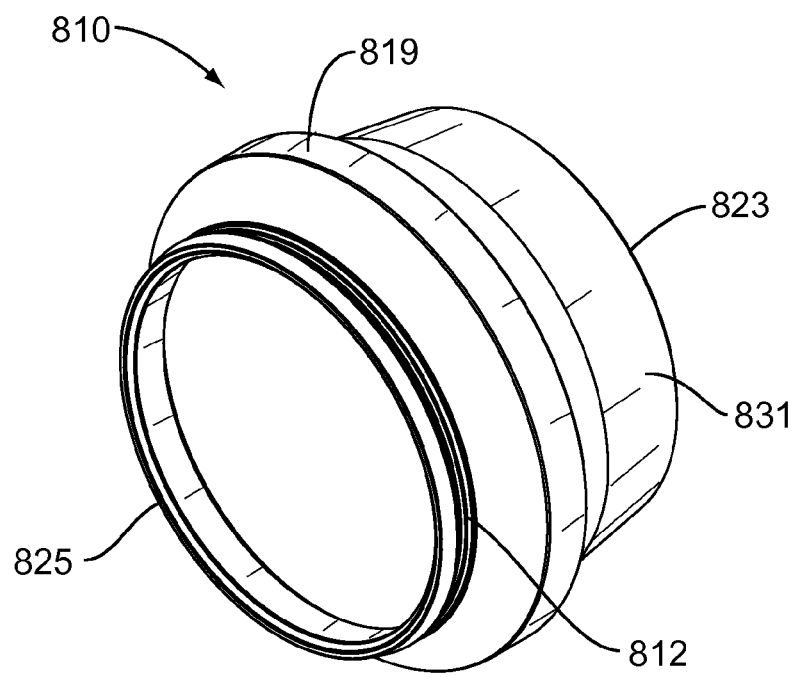
FIG. 13 is a perspective view of one embodiment of a base fitting for a swivel coupling according to the invention.
Figure 14:
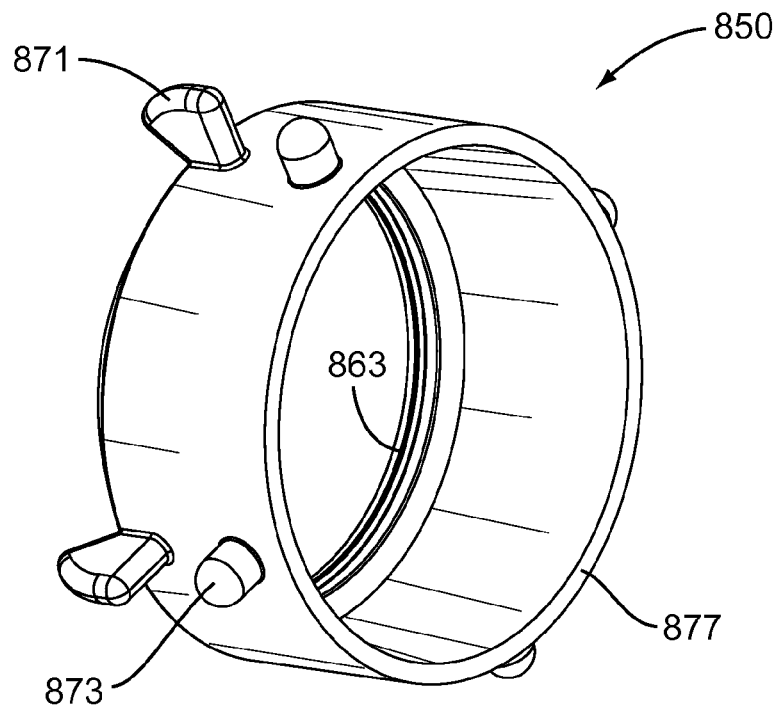
FIG. 14 is a perspective view of a male bayonet fitting for use with the base fitting shown in FIG. 13.

One embodiment of a collar portion 810 of the male swivel bayonet coupling 800 is shown in FIG. 13. The collar 810 includes a distal end 825 and a proximal end 823. A groove 812 circumferentially extends around the collar proximate its distal end 825. The spigot 831 on the proximal end 823 is configured to be inserted into an end of a hose 12, like that shown in FIG. 12. When the spigot 831 is fully inserted into the end of the hose 12, a rim 819 on the collar 810 extends around the outside of the hose 12. The rim 819 can act as a shield to protect a person's hand from the exposed end of a spiral reinforcement wire of the hose 12. A clamp 747 may be placed around a portion of the hose 12 that surrounds the inserted spigot 831, and tightened until the hose is securely clamped between the clamp 747 and the spigot 831, thereby securing the collar portion 810 to the end of the hose 12. Alternatively, the spigot 831 may be glued inside the end of the hose with a suitable adhesive. The distal end 825 of the collar 810 may rotatably receive a male bayonet connector 850 similar to the one shown in FIG. 14. The male bayonet connector 850 may include an internal circumferential lip 863 that is rotatably received within the groove 812 on the collar 810. Of course, other swivel fittings such as the female bayonet connector 150 or the swivel elbow 250 described above may be similarly configured and rotatably connected to the collar 810.

Figure 15:
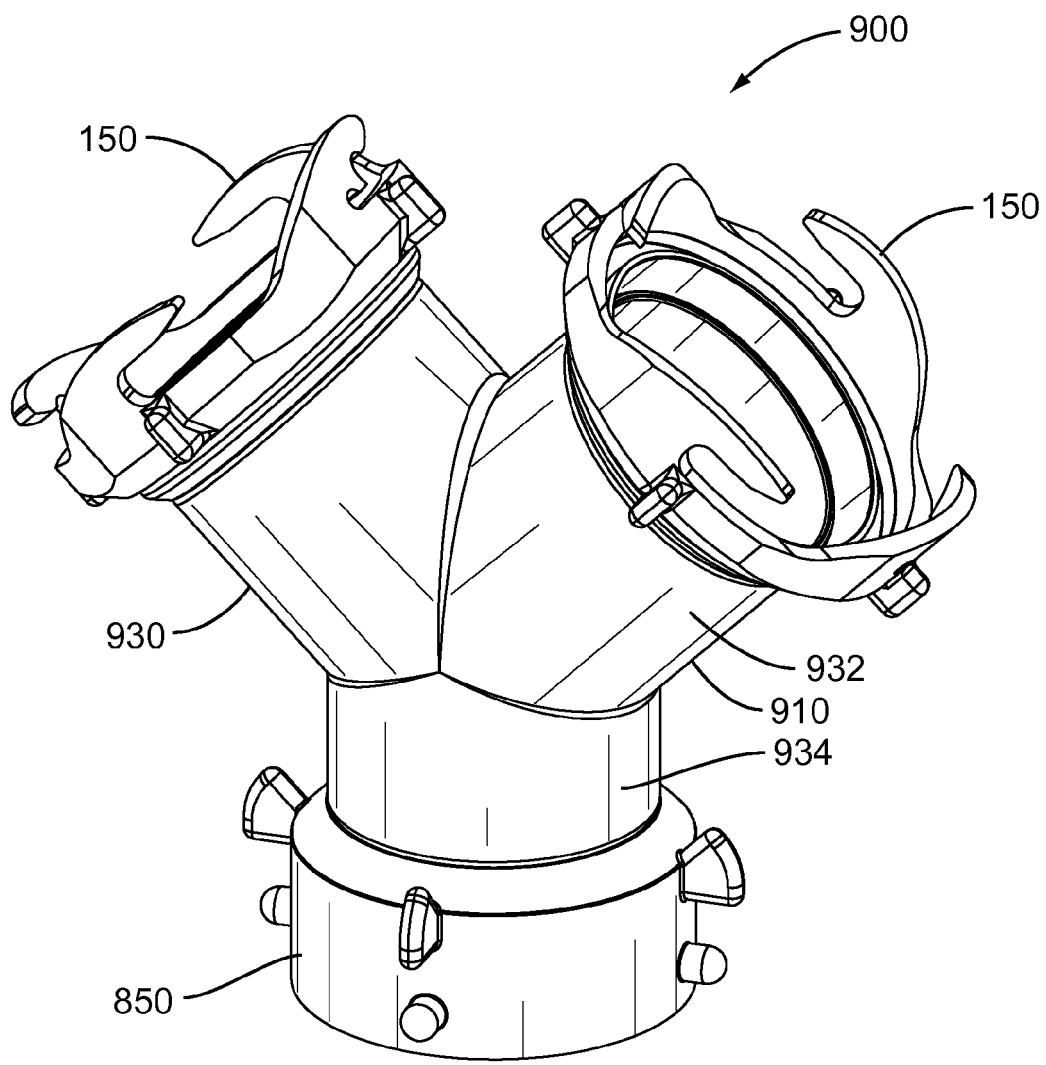
FIG. 15 is an elevation view of a Y-connector assembly with swivel fittings according to the invention.
Figure 16:
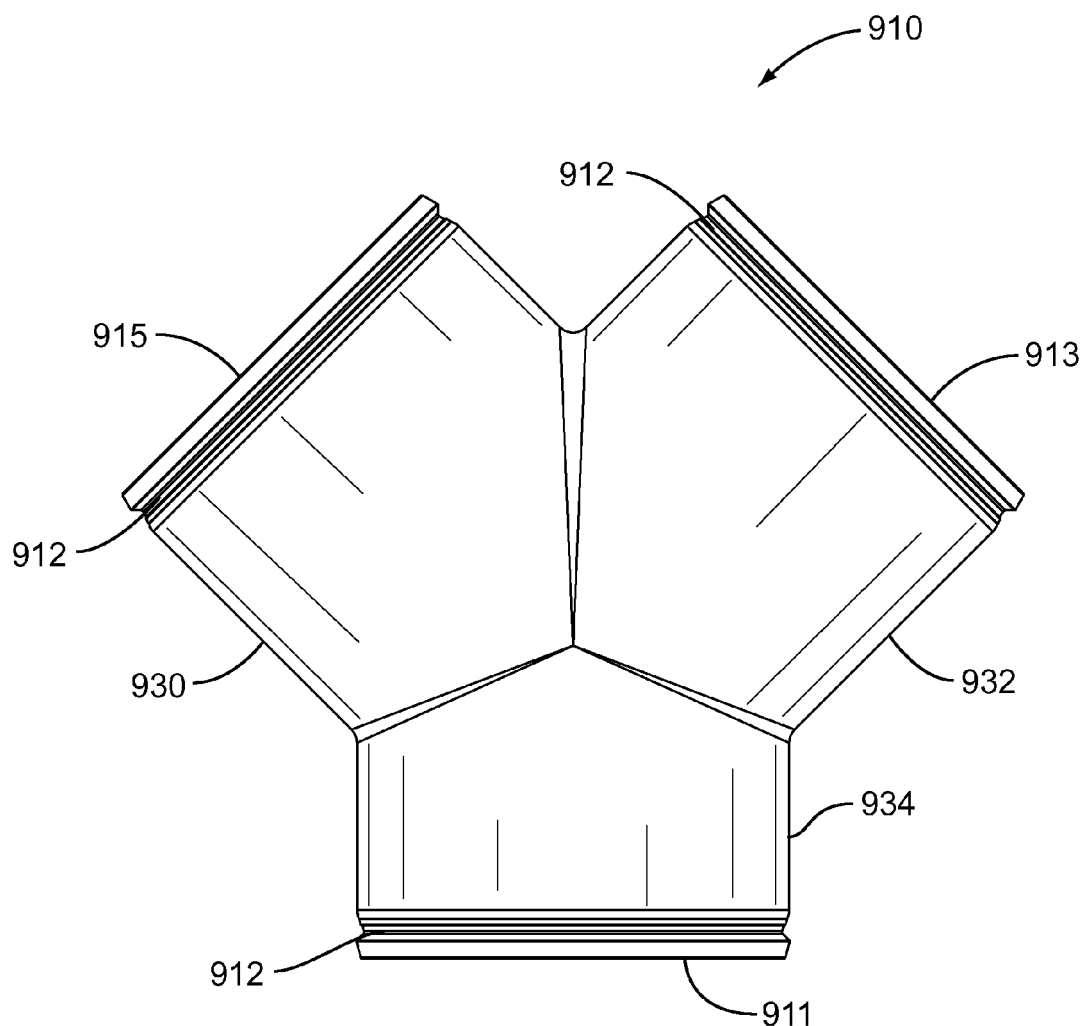
FIG. 16 is an elevation view of the base portion of the Y-connector assembly shown in FIG. 15.

Another aspect of the present invention is a Y-adapter 900, as shown in FIG. 15, that is configured with swivel hose connectors disposed on each of its three ends. The Y-adapter 900 includes a Y-shaped trunk 910 having a swivel female bayonet connector 150 rotatably disposed on each of its upper branches 930, 932, and a swivel male bayonet connector 850 rotatably disposed on the end of its lower branch 934. The Y-adapter 900 may be used to simultaneously connect two waste disposal hoses to a single waste station receptacle. As shown in FIG. 16, a circumferential groove 912 may be located proximate an end 911, 913, 915 of each of the three branches 930, 932, 934. As described above, the swivel fittings 150, 850 may include circumferentially extending lips that are received within the respective grooves 912, thereby securing the fittings 150, 850 to the trunk 910 while also permitting rotation between the fittings 150, 850 and the trunk 910. In one embodiment, the trunk 910 is constructed of a translucent or transparent material to permit a user to visually determine whether waste material is flowing or is present within the trunk 910.

The above descriptions of various embodiments of the invention are intended to describe and illustrate various aspects and features of the invention, and not to limit the invention thereto. Persons of ordinary skill in the art will understand that various changes and modifications may be made to the described embodiments without departing from the scope of the invention. For example, though specific types of rotatably and/or pivotally connected couplings and connectors are described above, it should be understood that substantially any type of coupling or connector may be rotatably and/or pivotally connected to another coupling or connector in the manner described above. These and other such changes and modifications are intended to be within the scope of the invention and the appended claims.

We claim:

1. A waste disposal assembly for a recreational vehicle, comprising:
   (a) a substantially cylindrical hose having a series of spiral ridges disposed about an outer circumference, and a first end;
   (b) a coupling secured to the first end of the hose, the coupling comprising:
      (i) a collar having an inner end, an outer end, a plurality of internal threads configured for threaded engagement with the spiral ridges of the cylindrical hose, and a plurality of spaced tabs extending radially outwardly; and
      (ii) a connector swivelly connected to the inner end of the collar;
   (c) a locking ring having a plurality of internal threads and an inner edge having a plurality of spaced teeth;
      (i) wherein the collar is configured to be selectively received on the first end of the substantially cylindrical hose such that the internal threads of the collar are threadably engaged with the series of spiral ridges;
      (ii) wherein the locking ring is configured to be selectively received on the first end of the hose such that the internal threads of the looking ring are threadably engaged with the series of spiral ridges and the inner edge is adjacent to the outer end of the collar; and
      (iii) the plurality of spaced teeth of the locking ring are configured to engage the spaced outwardly extending tabs of the collar, inhibiting relative rotation between the collar and the locking ring.

2. A waste disposal assembly according to claim 1, wherein the collar includes a circumferentially extending groove neat its inner end and the connector includes a circumferentially extending lip that is swivelly received within the groove.

3. A waste disposal assembly according to claim 1, wherein the collar includes a circumferentially extending lip near its inner end and the connector includes a circumferentially extending groove, the lip being swivelly received within the groove.

4. A waste disposal assembly according to claim 1, wherein the connector is selected from the group consisting of a female bayonet connector, a male bayonet connector, and an elbow.

5. A waste disposal assembly according to claim 4 wherein the elbow is constructed of a substantially translucent or substantially transparent material.

* * * * *

(12) SUPPLEMENTAL EXAMINATION CERTIFICATE
United States Patent
Price et al.

(10) Number: 8,465,059 F1
(45) Certificate Issued: Mar. 21, 2014

Control No.: 96/000,052
Primary Examiner: Aaron J. Lewis

Filing Date: Jan. 14, 2014

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 5,915,411 | 06/1999 | Gilbert et al. |
| 2006/0284422 | 12/2006 | Lunder |
| 1,200,118 | 10/1916 | Keeler |
| 1,089,650 | 03/1914 | Kile |
| 5,667,251 | 09/1997 | Prest |
| 4,400,022 | 08/1983 | Wright |
| 1,118,129 | 11/1914 | Herr |